(12) United States Patent
Schoenblum et al.

(10) Patent No.: US 9,781,420 B2
(45) Date of Patent: Oct. 3, 2017

(54) QUALITY METRIC FOR COMPRESSED VIDEO

(71) Applicant: Cisco Technology, Inc., San Jose, CA (US)

(72) Inventors: Joel W. Schoenblum, Alpharetta, GA (US); Gene Halbrooks, Somerville, MA (US); Joshua Gahm, Newtonville, MA (US); Benjamin L. Walton, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 14/824,420

(22) Filed: Aug. 12, 2015

(65) Prior Publication Data

US 2017/0048522 A1    Feb. 16, 2017

(51) Int. Cl.
*H04N 19/124* (2014.01)
*H04N 19/176* (2014.01)
*H04N 19/14* (2014.01)
*H04N 19/154* (2014.01)
*H04N 19/48* (2014.01)

(52) U.S. Cl.
CPC ........... *H04N 19/124* (2014.11); *H04N 19/14* (2014.11); *H04N 19/154* (2014.11); *H04N 19/176* (2014.11); *H04N 19/48* (2014.11)

(58) Field of Classification Search
CPC .... H04N 19/124; H04N 19/176; H04N 19/44; H04N 19/625
USPC ...................................................... 375/240.03
See application file for complete search history.

(56) References Cited

U.S. PATENT DOCUMENTS

| | | | |
|---|---|---|---|
| 2005/0286631 A1* | 12/2005 | Wu ....................... | H04N 19/176 375/240.12 |
| 2009/0086816 A1* | 4/2009 | Leontaris ............. | H04N 19/154 375/240.03 |
| 2012/0069896 A1* | 3/2012 | Yang .................... | H04N 19/147 375/240.03 |
| 2014/0321561 A1* | 10/2014 | Stec .................. | H04N 19/00545 375/240.29 |
| 2015/0085943 A1* | 3/2015 | Taniguchi ................ | H04N 5/21 375/240.29 |
| 2016/0295250 A1* | 10/2016 | Yang .............. | H04N 21/234381 |
| 2016/0301931 A1* | 10/2016 | Wen ..................... | H04N 19/147 |

* cited by examiner

*Primary Examiner* — Zhihan Zhou
(74) *Attorney, Agent, or Firm* — Merchant & Gould P.C.

(57) ABSTRACT

Methods and systems are disclosed for calculating and applying a VQ metric which operates during the decoding of compressed video. As such, this metric is appropriate for all formats of compressed video codecs (e.g. MPEG-2, AVC and HEVC.) The VQ metric relies on the decoded quantization parameter (Qp) together with analysis of both the compressed and decoded video. As such, the VQ metric does not require a reference video, and is less cumbersome to use for multiple channels, e.g., statistically multiplexed channels.

23 Claims, 6 Drawing Sheets

Edge Coefficients

Texture Coefficients

FIG. 6 though the use of metric databases (such as the University of Texas LIVE database and the Video Quality Experts Group 2000 database, among others). These databases may provide a direct correlation measurement between a video quality metric and mean opinion scores of viewers of the same video.

Prior video quality metrics are typically full-reference metrics. In other words, the metrics require the original unmolested source video to calculate a value for the metric. Such approaches may be cumbersome to employ, particularly when the measurements are required for a set of video channels as opposed to a single video channel.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Methods and systems are disclosed which can provide stream VQ values by at least: receiving a first encoded video frame of a first video stream comprising a first plurality of video frames, the first encoded video frame comprising a first plurality of macroblocks; storing a macroblock type and a quantization parameter (Qp) for each of the first plurality of macroblocks; calculating a weighted average Qp for the first encoded video frame's reference frames if the first encoded video frame is a non-reference frame; calculating an adjusted Qp value for each of the first plurality of macroblocks; calculating a weighted sum of all adjusted Qp values; converting the weighted sum to a frame adjusted Qp; mapping the frame adjusted Qp to a frame VQ; and calculating a stream video quality (SVQ) for the first video stream as a nonlinear average of frame VQs for the first plurality of video frames.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the present disclosure may provide a stream video quality (SVQ) metric operable during the decoding of compressed video. The SVQ metric may be appropriate for all formats of compressed video codecs. Example formats include, but are not limited to, Moving Pictures Expert Group-2 (MPEG-2), Advanced Video Coding (AVC), and High Efficiency Video Coding (HEVC). The SVQ metric may rely in part on a decoded quantization parameter ($Q_p$) used in conjunction with analysis of both compressed and decoded versions of the subject video. Accordingly, embodiments of the present disclosure not require a reference video, which makes it more easily computable and therefore more easily deployable for multiple channels, such as statistically multiplexed channels.

A computing device, such as an encoder, provides the quantization parameter $Q_p$ settings in the coded blocks of pictures. Edges may be applied a finer $Q_p$, while a coarser $Q_p$ may be applied to high variance blocks without edges. Similarly, a coarser relative $Q_p$ may be used on non-reference pictures. Additionally, encoders may avoid a coarser relative $Q_p$ on non-reference pictures containing fades, flashes, and/or other content containing significant temporal differences. An encoder may further know which temporal block may be skipped during the encoding process. The aim of the present invention is to provide a metric which can assess the performance of how the encoder has chosen to assign $Q_p$ to different pictures and blocks and how this performance relates to perceived video quality.

Figure 1:
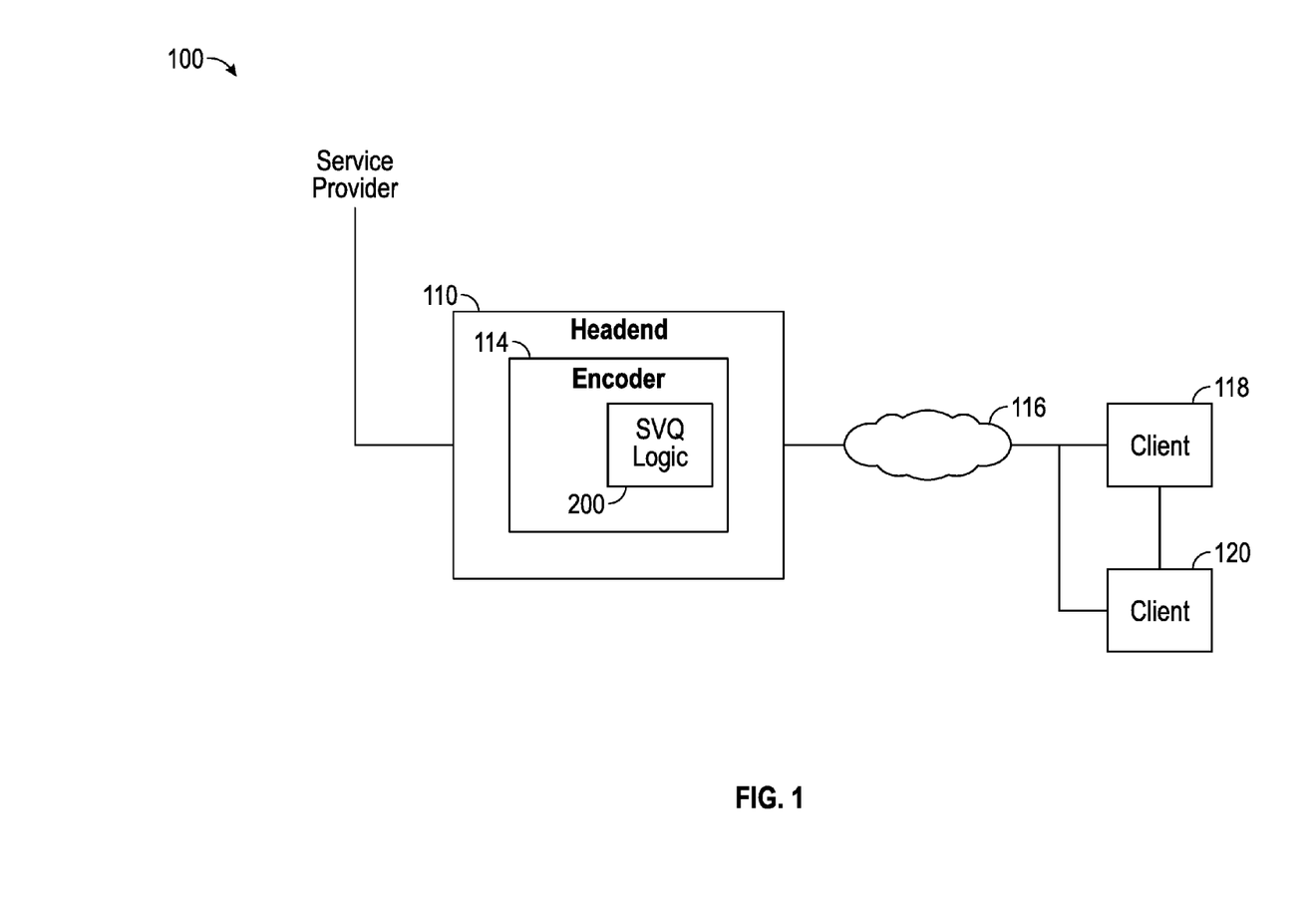
FIG. 1 illustrates an example network environment 100, in which certain embodiments of SVQ systems and/or methods may be implemented.

FIG. 1 illustrates an example network environment 100, in which certain embodiments of SVQ systems and/or methods may be implemented. The network environment 100 may include a plurality of individual networks, such as a wireless network and/or a wired network, including wide-area networks (WANs), local area networks (LANs), among others. Network environment 100 may include a headend 110 that receives (and/or generates) video content, audio content, and/or other content (e.g., data) sourced at least in part from one or more service providers, processes and/or stores the content, and delivers the content over a communication medium 116 to one or more client devices 118 through 120.

Headend 110 may comprise an encoder 114 having video compression functionality. Encoder 114 may further comprise SVQ logic 200 configured to receive encoded video (e.g., compressed video frames or pictures) at least a portion of which (or the entirety) is corrupted by noise. Such noise may be introduced via camera sensors, from previously encoded frames (e.g., artifacts introduced by a prior encoding process from which the raw video was borne) among other sources. SVQ logic 200 may be configured to provide a video quality metric for video encoded by encoder 114. In some embodiments, at least a portion of the raw video sequence may bypass SVQ logic 200 and be fed directly into encoder 114.

Throughout the disclosure, the terms pictures and frames may be used interchangeably. In some embodiments, SVQ logic 200 may comprise a component that may be physically and/or readily de-coupled from encoder 114 (e.g., such as in the form of a plug-in-card that fits in a slot or receptacle of encoder 114). In some embodiments, SVQ logic 200 may be integrated in encoder 114, such as integrated in an applications specific integrated circuit (ASIC). Although described herein as logic for a headend component or device, in some embodiments, SVQ logic 200 may be co-located with encoding logic at a client device, such as client device 118, or positioned elsewhere within a network, such as at a hub, gateway, or network device as described in more detail in regards to FIG. 6.

Headend 110 may also comprise other components, such as QAM modulators, routers, bridges, Internet Service Provider (ISP) facility servers, private servers, on-demand servers, multi-media messaging servers, program guide servers, gateways, multiplexers, and/or transmitters, among other equipment, components, and/or devices well-known to those having ordinary skill in the art. Communication of Internet Protocol (IP) packets between client devices 118 through 120 and headend 110 may be implemented according to one or more of a plurality of different protocols, such as user datagram protocol (UDP)/IP, transmission control protocol (TCP)/IP, among others.

In one embodiment, client devices 118 through 120 comprise set-top boxes coupled to, or integrated with, a display device (e.g., television, computer monitor, etc.) or other communication devices and further coupled to the communication medium 116 (e.g., hybrid-fiber coaxial (HFC) medium, coaxial, optical, twisted pair, etc.) via a wired connection (e.g., via coax from a tap) or wireless connection (e.g., satellite). In some embodiments, communication between headend 110 and client devices 118 through 120 comprises bi-directional communication over transmission medium 116 by which content is received from headend 110, or via a separate connection (e.g., telephone connection). In some embodiments, communication medium 116 may comprise of a wired medium, wireless medium, or a combination of wireless and wired media, including by way of non-limiting example Ethernet, token ring, private or proprietary networks, among others. Client devices 118 through 120 may henceforth comprise one of many network devices, such as cellular phones, personal digital assistants (PDAs), computer devices or systems such as laptops, personal computers, set-top terminals, televisions with communication capabilities, DVD/CD recorders, among others. Other networks are contemplated to be within the scope of the disclosure, including networks that use packets incorporated with and/or compliant to other transport protocols or standards.

SVQ logic 200 may be implemented in hardware, software, firmware, or a combination thereof. To the extent certain embodiments of SVQ logic 200 or a portion thereof are implemented in software or firmware, executable instructions for performing one or more tasks of SVQ logic 200 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of SVQ logic 200 or a portion thereof are implemented in hardware, SVQ logic 200 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

A Weighted $Q_P$ Average (WQA) may be performed for all reference frames after the macroblocks of the reference frames are classified as one of: edge, texture, or flat. Reference frames may include, for example, I-frames and P-frames in MPEG-2 video. A higher weighting may be applied in the WQA for macroblocks that are classified as edges.

A WQA may also be calculated for non-reference frames (such as B-frames). For these non-reference frames, the WQA may be calculated in a similar fashion. However, macroblocks of non-reference frames may be additionally classified as low or high contrast, low or high motion, and non-intra or intra. In some embodiments of the present disclosure, a $Q_P$ average for non-reference frames may be maintained separately for the different identified classes of macroblocks in the frames.

A WQA may then be computed for the non-reference frames by weighting the $Q_P$ average of the different identified classes of macroblocks in the frames. Each $Q_P$ average per macroblock class may be adjusted based on a distance the $Q_P$ average is from the associated reference frame's WQA. For example, a non-reference B-frame may have a non-edge $Q_P$ average of 9. The associated reference P-frame may have a WQA of 6. As such, the non-edge $Q_P$ average for the non-reference B-frame may be adjusted to 7. In some embodiments of the present disclosure, an additional adjustment may be made accounting for the DC shift (average luminance) of the non-reference frame as compared to the immediately previous frame.

Generally, non-reference frames may be more highly compressed than reference frames. As such, the $Q_P$ average adjustments may provide insight as to where higher compression has potentially adversely affected video quality. For example, a relatively non-dynamic video (e.g., a talking head speaking from a fixed position) may not be as adversely affected by large $Q_P$ differences between reference and non-reference frames. On the other hand, relatively dynamic video (e.g., a live sports broadcast) may contain larger numbers of intra macroblocks, fades, and flashes. Accordingly, this relatively dynamic video may contain large DC shifts. With such video, large $Q_P$ differences between non-reference frames and reference frames may cause noticeable degradation of the video quality.

Regardless of frame type, the WQA value may be mapped to a video quality measure for each frame to form a Frame_VQ measurement. The stream video quality (Stream_VQ) may then be defined as a nonlinear average of Frame_VQ values for all frames comprising the video stream. In some embodiments of the present disclosure, impairments may be weighed more heavily in accordance with predetermined expert viewer perception.

Figure 2:
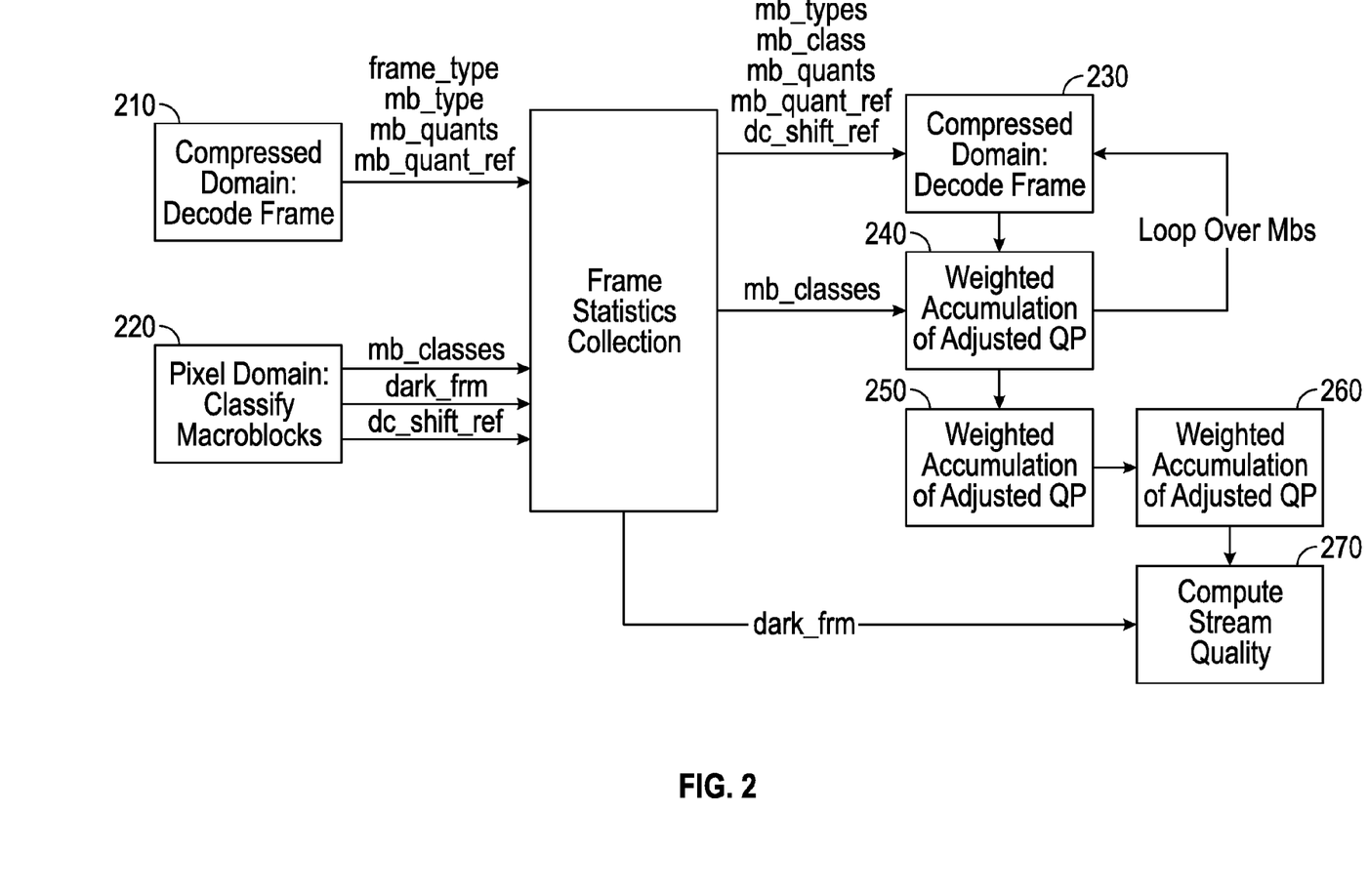
FIG. 2 illustrates a flow chart of sample embodiments of SVQ logic 200.

FIG. 2 illustrates a flow chart describing embodiments of the no-reference video metric, such as SVQ logic 200. Embodiments of the present disclosure employ a quality metric that may rely on both compressed and uncompressed characteristics of the video stream. FIG. 2 shows the detailed processing flow for computing the video quality metric of a compressed video stream. The processing shown occurs on each video frame, where frames typically arrive at regular intervals such as 30 frames/second for interlaced NTSC video. The VQ measurement described would support any frame rate and therefore any frame rate would be considered within the scope of the present disclosure.

The processing includes frame statistics collection during decoding (compressed domain processing), and the generation of certain frame statistics after the frame has been decoded (pixel domain processing). After the frame statistics have been computed and collected, the video quality of an individual frame is computed by looping over the transform blocks (e.g., macroblocks, or MBs) of the video frame, and computing an adjusted Qp for the frame (qp_adj_avg_frame). From qp_adj_avg_frame, a table lookup may be employed to compute the quality of the frame (frame_vq). After the quality of an individual video frame is computed, frame_vq is averaged non-linearly to produce a measure of the overall stream video quality (stream_vq).

SVQ logic method 200 may start at step 210 where compressed video domain processing may take place. Video which has been compressed to the MPEG-2, AVC or HEVC standards may share certain characteristics. Each of these standards includes certain attributes of the compression process: Frame Types, Transform Blocks, e.g., Macroblocks, Headers, and Quantization Parameters (Qp).

Frame Types (also known as Picture Types) may include Intra, Predicted, and Bi-Predicted, or I,B,P for short. For Intra frames (I-frames), the entire frame may be decodable without needed any surrounding frames in the decoding process. For Predicted frames (P-frames), since P-frames are coded differentially to a neighboring I or P reference frame, P-frames require those frames together with the P-frame in order to be decoded. B-frames are bi-predicted, meaning they are encoded differentially to two neighboring I or P reference frames, so B-frames require several other reference frames (i.e., I or P frames) for decoding. For AVC and HEVC standards, B-frames can require more than two reference frames, but it is limited to two for the older MPEG-2 standard. Additionally, for AVC and HEVC standards, B-frames can serve as reference frames, so B-frames may be differentially encoded with respect to I, P or B frames.

All of the standardized video compression schemes (MPEG-2, AVC and HEVC) may include transform blocks. In MPEG-2 and AVC, these are called macroblocks, which are a constant size of 16×16 pixels. Each frame is partitioned into non-overlapping macroblocks. For example, an SD 720×480 pixel frame would therefore have 30 rows of 45 macroblocks. In HEVC, the transform blocks are no longer constant size, and are therefore no longer delineated as macroblocks. Without loss of generality, we will refer to the transform blocks throughout this description as macroblocks, with the understanding that HEVC transform blocks are supported.

Each Frame has a header in the compressed video indicating the Frame Type, and each macroblock has a header indicating the macroblock type and other characteristics of the macroblock. For I-frames, each macroblock must be an INTRA type macroblock, because I frames cannot support differentially encoded macroblocks, as explained above. In addition to macroblock type (mb_type), macroblock headers indicate the quantization parameter Qp of the macroblock mb_quant. The Qp used for the macroblock is a major indication of the quality of the encoding of the macroblock. The finer (or lower) the value of Qp, the more bits will be spent on the macroblock during encoding (lower compression). A coarser (higher) value of Qp will result in less bits spent on the macroblock during encoding (larger compression), with potentially lower perceived quality for that part of the frame.

Accordingly, certain prior approaches simply measure the average value of Qp in the frames of the compressed video as an indication of the quality of the video compression. Embodiments of the present disclosure go several steps further, i.e., to use more information of the encoded stream (in the compressed domain), combined with information about the video characteristics (in the pixel domain, i.e., from decoded frames) to produce an intelligent Qp (or adjusted Qp) which can then be mapped to video quality for the frame.

In addition to storing statistics of the macroblock quant (mb_quant) for each macroblock of each frame, the weighted average Qp of a non-I frame's reference frames is computed as well (mb_quant_ref). The compressed domain processing described in step 210 may provide a collection of statistics of all of the macroblocks of the frame, including all mb_type and mb_quant information along with frame_type.

At step 220, a decoded video frame may be obtained from a decoder operating on the compressed video frame. The decoded video frame is then subject to uncompressed domain processing. First, a macroblock class (mb_class) may be determined. In some embodiments of the present disclosure, mb_class may include classifications of: edge or non-edge for each macroblock.

It is well known to those experienced in the art that edges within video have a particular importance to the human visual system, and that when viewing scenes, the human brain derives much of the information of the scene through the visual processing of edge information. Indeed, it can be shown that through image processing, scenes can be completely washed out, producing a synthetic looking result, but if the edges of the original video are preserved, the viewer will nevertheless have a thorough understanding of the original scene.

Better encoders of compressed video therefore include, much of the time, a sensitivity of the video compression where edges appear in the video scene. An encoder must decide, during the compression of the video, how to distribute Qp among the macroblocks to produce the desired bits for the frame, while preserving perceived video quality to the maximum extent. Therefore, encoders are careful about the Qp assigned to macroblocks that include edges.

There are many edge detection methods in prior art for video frames, such as the well-known Canny and Sobel edge detectors. We include the following edge detection scheme, to classify macroblocks as having edge or no edge, with the understanding that any edge detection scheme would be within the scope of the present disclosure.

Figure 3:
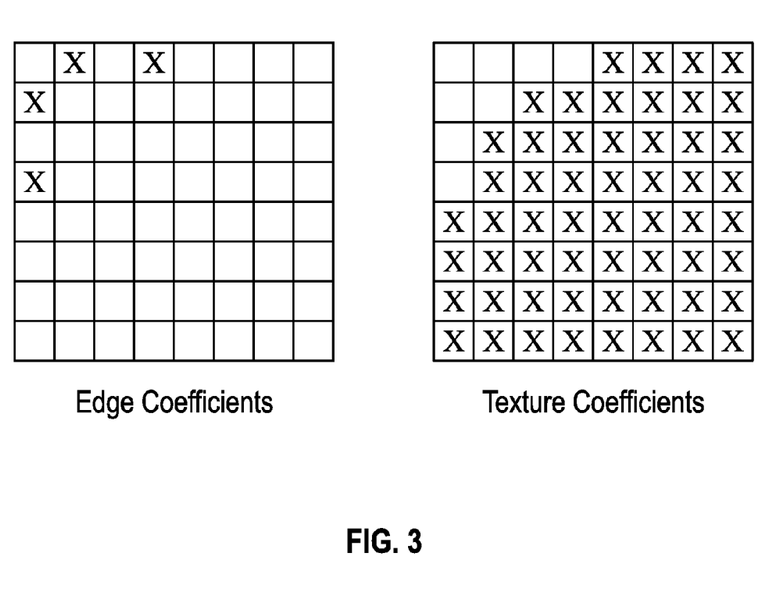
FIG. 3 illustrates sample DCT coefficients according to embodiments of the present disclosure.

For example, a frame comprising 16×16 macroblocks may be decimated to 8×8 through a factor of two vertically and horizontally. This allows a classification process to employ an 8×8 Discrete Cosine Transform (DCT) providing an 8×8 DCT result as illustrated in FIG. 3. Four DCT coefficients may then be summed to first test for whether the macroblock is classified as an edge. For example, $G_x=3*F_{1,0}+F_{3,0}$ and $G_y=3*F_{0,1}+F_{0,3}$. Then, $G_{tot}=|G_x|+|G_y|$.

$G_{tot}$ may then be compared to an edge threshold (T_BLK_CLASS_EDGE_THRESH). If $G_{tot}$ is greater than T_BLK_CLASS_EDGE_THRESH, mb_class may be classified as edge. If not, then mb_class may be classified as non-edge.

The next step of uncompressed domain processing may comprise determining a DC shift value relative to the video frame's reference frames (dc_shift_ref). Video is encoded in the luminance-chrominance color space according to all compression standards. The DC value of the frame may be computed as an average of all the luminance pixels of the frame. For each non-I frame (i.e., B-frames or P-frames), the DC shift compared to the frame's reference frames may be computed as the difference between the non-I frame DC value and the reference DC value. For frames with more than one reference, e.g., B-frames, the difference is computed as the minimum of differences of the various reference frames.

For example, let $DC\_R_i$ represent the DC value of reference frame i for a current non-I frame, and let $DC\_F_i$ represent the DC value for the current non-I frame. $DC\_Shift\_F_i$ may then be calculated as the difference of the DC value for the current non-I frame and it references as follows: $DC\_Shift\_F_i=min(DC\_R_i)$ over $i=1, 2, \ldots N_{ref}$ where $N_{ref}$ is the number of reference frames for the current non-I frame.

The next step of uncompressed domain processing may comprise determining a dark frame classification (dark_frame). If the DC Value calculated above is below a threshold for every macroblock of the frame, then the frame may be labelled as a dark frame. Accordingly, dark_frame may be set equal to 1 if $MB_{dc}(k)$ is less than $<T_{dark}$ for all $k=1, 2, N_{mb}$. Otherwise, dark_frame may be set equal to 0.

$MB_{dc}(k)$ may represent the DC value of a macroblock of pixels, which is the average of the 16×16 luminance pixels. $N_{mb}$ may be the number of macroblocks of the frame threshold. $T_{dark}$ may represent the threshold value, such as $T_{dark}=40$. In addition to providing the dark_frame classification, the macroblock classification may include whether or not the macroblock is a dark macroblock in addition to whether is an edge or non-edge.

Subsequently, method 200 may proceed to step 230. At step 230, for each macroblock of the frame, an adjusted Qp (mb_adj_qp) may be computed. A weighted sum of all the mb_adj_qps of the frame may be computed. After normalization, the weight sum of the mb_adj_qps may be converted to a frame adjusted Qp (frame_adj_qp). Finally, a table lookup of the quality of the frame may be performed using frame_adj_qp.

Next, at step 240, a macroblock adjusted Qp (mb_quant_adj) may be calculated. For all macroblocks j of the frame, with $j=1, 2, \ldots N_{mb}$, if the macroblock is not an Intra-macroblock, the Qp of the frame, mb_quant(j) may be compared with the weighted Qp of the frames references (mb_quant_ref). If mb_quant_ref is smaller than the macroblock's mb_quant(j), then the macroblock's Qp may be adjusted to a smaller value. Note that for I-frames, all macroblocks are of type mb_type==Intra, and there are no reference frames, so the following equation may be bypassed for I frames, and mb_quant_adj(j) is always the same as mb_quant(j) in I frames. Accordingly, for non-I frames, mb_quant_adj(j) equals mb_quant(j) when the macroblock type is Intra.

Equation 1:

---

If Non-Intra(j) AND DC_Shift < Tshift AND mb_quant_ref < mb_quant(j)
{
    mb_quant_adj(j) = mb_quant_ref + (mb_quant(j) – mb_quant(j)/Ts1) if
mb_quant(j) < mb_quant_ref + T1
mb_quant_adj(j) = {
    mb_quant_ref + (mb_quant(j) – mb_quant(j) /Ts2) otherwise
    }
mb_quant_adj(j) = mb_quant(j) otherwise

---

In Equation 1, Ts1, Ts2 and T1 may be constants determined according to the particular compression standard used, i.e., MPEG-2, AVC or HEVC. Exemplary values may be Ts1=3 and T1=5 for MPEG-2.

Method 200 may subsequently proceed to step 250. At step 250, the mb_quant_adj(j) values may be accumulated for each macroblock j in the frame with $j=1, 2, \ldots N_{mb}$. For example, mb_adjusted_qp_wsum=Σw(j)*mb_quant_adj(j) and mb_weight_sum=Σw(j). w(j) may represent the weighting assigned to a particular macroblock.

In some embodiments of the present disclosure, w(j) may be determined as a function of mb_class(j) as shown in Table 1.

TABLE 1

| w(j) Assignment According to mb_class | |
|---|---|
| mb_class(j) | w(j) |
| Mb_class is Edge and Non-Dark | 3.5 |
| Mb_class is Edge and Dark | 0.3 |
| Mb_class is Non-Edge and Dark | 0.2 |
| Mb_class is Non-Edge and Non-Dark | 1 |

After the weight accumulation of mb_quant_adj(j) is performed, the frame adjusted Qp (frame_qp_adj) may be computed as: frame_qp_adj=mb_adjusted_qp_wsum/mb_weight_sum. Note that the accumulation of Qp for the frame over the macroblocks weighs more heavily edge macroblocks, and provides low weighting for dark macroblocks. The reason for this is that edges are important features to the human visual system, while dark areas of scenes are the opposite.

Method 200 may subsequently proceed to step 260. At step 260, the frame video quality (FRAME_VQ) may be computed. After Qp frame_qp_adj is computed for the frame as specified above, the FRAME_VQ quality measurement may be obtained directly via a look-up table. A separate look-up table may be provided for each codec format (e.g., MPEG-2, AVC, HEVC) and SD vs. HD resolution. FRAME_VQ represents the video quality measured for a given frame. A non-linear average of the FRAME_VQ values is performed later as an overall measurement of the stream video quality. Table 2 illustrates an exemplary table to compute FRAME_VQ from the WQA is provided below for MPEG-2 SD.

TABLE 2

Example Look-up Table for MPEG-2 SD

```
float qavg_to_svq_frame_table[ ]=
{
    1.0, // bogus
    1.0, // qp=1
    1.0, // qp=2
    0.99, // qp=3
    0.98, // qp=4
    0.96, // qp=5
    0.94, // qp=6
    0.93, // qp=7
    0.92, // qp=8
    0.91, // qp=9
    0.90, // qp=10
    0.89, // qp=11
    0.87, // qp=12
    0.85, // qp=13
    0.83, // qp=14
    0.81, // qp=15
    0.80, // qp=16
    0.79, // qp=17
    0.78, // qp=18
    0.76, // qp=20
    0.74, // qp=21
    0.71, // qp=22
    0.68, // qp=23
    0.65, // qp=24
    0.62, // qp=25
    0.59, // qp=26
    0.56, // qp=27
    0.52, // qp=28
    0.46, // qp=29
    0.40, // qp=30
    0.36, // qp=31
};
```

Method 200 may subsequently proceed to step 270. At step 270, STREAM_VQ is computed for the overall video stream as a non-linear average of the individual FRAME_VQ values which are computed as specified hereinabove. Each frame has an assigned weight, svq_weight, as illustrated in Table 3:

TABLE 3

Example SVQ_WEIGHT Table

```
svq_weight=1;
if(svq_weight > 0.94) then svq_weight=1;
else if(svq_weight > 0.92) then svq_weight=2;
else if(svq_weight > 0.90) then svq_weight=4;
else if(svq_weight > 0.88) then svq_weight=8;
else if(svq_weight > 0.85) then svq_weight=16;
else if(svq_weight > 0.80) then svq_weight=32;
else if(svq_weight > 0.70) then svq_weight=48;
else svq_weight=64.
```

The rationale for the weighting above is to match viewer sensitivity to brief dips in perceived video quality. With the weighting defined hereinabove, the weighted stream video quality (W_STREAM_VQ) may be computed as:

$$\Sigma_{i=1}^{N} svq\_weight(i) * FRAME\_VQ(i) / \Sigma_{i=1}^{N} svq\_weight(i)$$

N may represent the number of frames of the video stream. sqv_weight(i) and FRAME_VQ(i) are the svq weight and FRAME_VQ for frame i respectively. In some embodiments of the present disclosure, a final STREAM_VQ may be computed by mapping the W_STREAM_VQ as follows: STREAM_VQ=$10^{W\_STREAM\_VQ}$.

The computational efficiency of embodiments of the present disclosure may be seen in Table 4. The data in Table 4 illustrates results from the actual prototyping of the QV metrics tested based on execution time per frame. Each of the prior art metrics (non-SQV) are full-reference metrics. Presently described embodiments of SQV are no-reference. The SVQ-opt model in Table 4 represents SVQ after deleting some chroma processing during the usual decoding of the video stream.

TABLE 4

QV Metric Computational Efficiency

| Model | Per-frame Execution Time (ms) |
| --- | --- |
| Peak Signal-to-Noise Ratio (PSNR) | 2.1 |
| SVQ-opt | 16.5 |
| SVQ | 49.4 |
| Structural Similarity (SSIM) | 256.4 |
| Image Quality Assessment based on Spectral Residuals (SR-SIM) | 94.8 |
| Multi-Scale SSIM (MS-SSIM) | 1313.5 |
| Motion-Based Video Integrity Evaluation (MOVIE) | ~36000000.0 |

Embodiments of the present disclosure have been tested using the University of Texas LIVE video database. The LIVE video database is one of the most frequently used databases for assessing the performance of a video quality metric. The LIVE video database was created in 2010 and includes 15 SD 4:2:0 test sequences (748×432) and four distortion types: MPEG-2 compression, H.264 compression, IP network errors, and wireless errors. Each sequence was evaluated by 38 human observers.

The performance in terms of Spearman Rank Order Correlation Coefficient (SROCC) of various metrics against the LIVE database is illustrated in Table 5 for AVC and MPEG-2 encoded video stream. SROCC is a measure of the correlation between the metric and the human scores of the videos. A perfect correlation would equal 1.0. As shown in Table 5, all tested metrics perform considerably better than PSNR.

TABLE 5

SROCC of VQ Metrics on LIVE Database

| Model | Year | AVC | MPEG-2 | Source | Full Reference? |
| --- | --- | --- | --- | --- | --- |
| PSNR | — | 0.43 | 0.36 | n/a | Yes |
| SSIM | 2002 | 0.65 | 0.55 | University of Texas | Yes |
| Visual Signal to Noise Ratio (VSNR) | 2007 | 0.65 | 0.59 | Oklahoma State University | Yes |
| SR-SIM | 2012 | 0.64 | 0.68 | Tongji university | Yes |
| MS-SIM | 2013 | 0.71 | 0.66 | University of Texas | Yes |
| Video Quality Metric (VQM) | 2004 | 0.65 | 0.78 | National Telecommunications and Information Administration (NTIA) | Yes |
| SVQ | 2014 | 0.74 | 0.76 | Cisco | No |
| MOVIE | 2009 | 0.77 | 0.77 | University of Texas | Yes |
| Spacio-temporal Most Apparent Distortion ST-MAD | 2012 | 0.91 | 0.84 | Oklahoma State University | Yes |

Oklahoma State University developed the Computational Perception and Image Quality (CSIQ) database in 2012. The CSIQ database consists of 12 SD 832×480 reference videos and 216 distorted videos. Each reference video has six types of distortion. Each type of distortion has three different levels. The distortion types include four video compression distortion types [Motion JPEG (MJPEG), H.264, HEVC, and wavelet compression using SNOW codec64]. The distortion types further include two transmission-based distortion types [packet-loss in a simulated wireless network (WLPL) and additive white Gaussian noise (AWGN)].

Table 6 illustrates the performance of embodiments of the present disclosure and other prior video quality metrics against the CSIQ database with AVC encoding. There is less data for VQ metrics performance on CSIQ for individual distortions (e.g., AVC) compared to the LIVE database. However, it may be seen that SVQ is competitive with recent full-reference VQ metrics on CSIQ.

TABLE 6

SROCC of VQ Metrics on CSIQ Database

| Model | SROCC on AVC |
|---|---|
| PSNR | 0.80 |
| MOVIE | 0.90 |
| VQM | 0.92 |
| SVQ | 0.92 |

Figure 4:
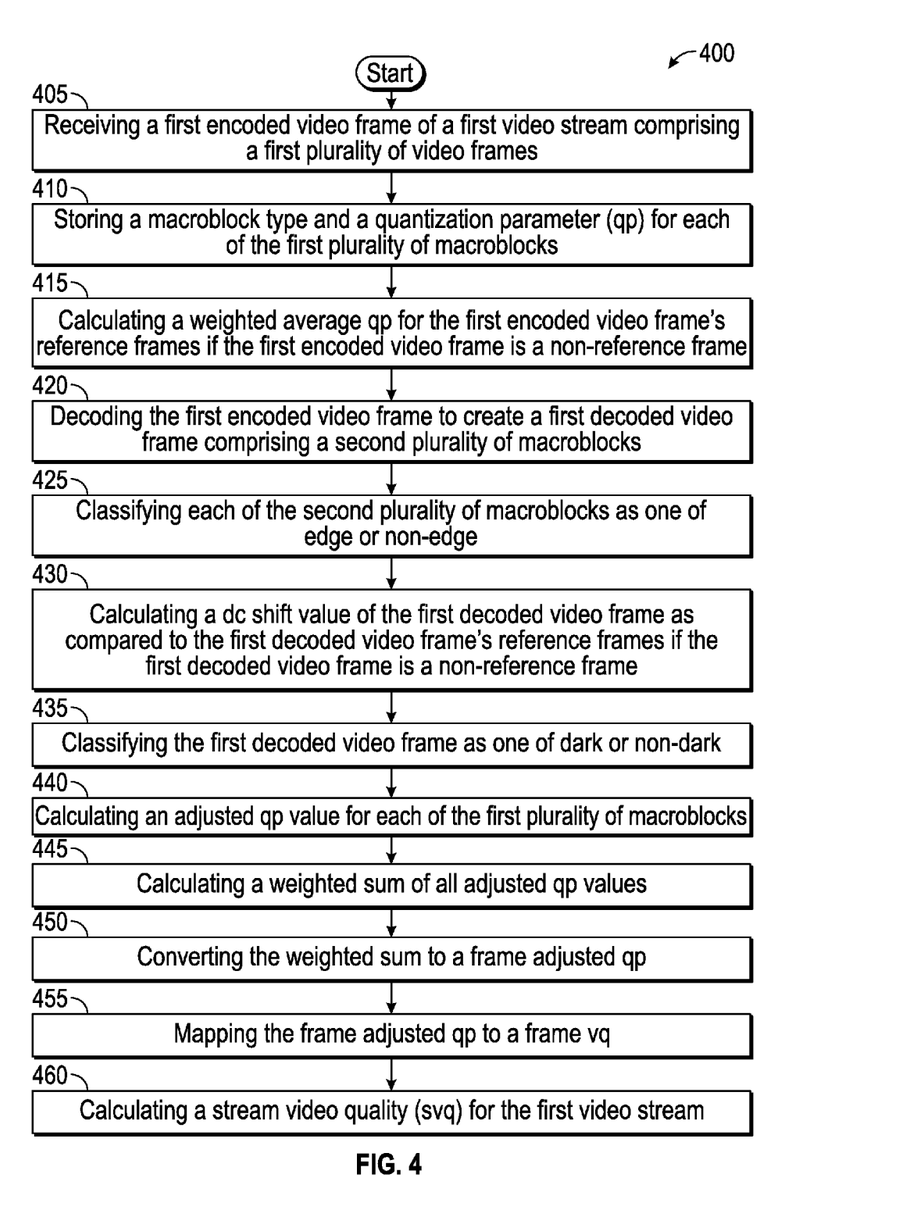
FIG. 4 illustrates a flow chart of sample embodiments of the present disclosure.

FIG. 4 is a flow chart illustrating embodiments of the present disclosure. Method 400 may begin at step 405. At step 405, a first encoded video frame of a first video stream comprising a first plurality of video frames may be received. The first encoded video frame may comprise a first plurality of macroblocks.

Method 400 may next proceed to step 410. At step 410, a macroblock type and a quantization parameter (Qp) for each of the first plurality of macroblocks may be stored. In some embodiments of the present disclosure, the Qp values for each of the first plurality of macroblocks may be extracted during a decoding process. In some embodiments of the present disclosure, Qp values for non-reference frames may be maintained separately by classification (using both edge and darkness classifications as discussed below).

Method 400 may next proceed to step 415. At step 415, a weighted average Qp may be calculated for the first encoded video frame's reference frames if the first encoded video frame is a non-reference frame. Method 400 may next proceed to step 420. At step 420, the first encoded video frame may be decoded to create a first decoded video frame comprising a second plurality of macroblocks.

Method 400 may next proceed to step 425. At step 425, each of the second plurality of macroblocks may be classified as one of edge or non-edge. In some embodiments of the present disclosure, each macroblock may be decimated. Subsequently, a Discrete Cosine Transform (DCT) may be performed on the decimated macroblock. The plurality of DCT coefficients may then be summed and the macroblock may be classified as edge only if the DCT coefficient sum is greater than an edge threshold value.

Method 400 may next proceed to step 430. At step 430, a DC shift value of the first decoded video frame may be calculated as compared to the first decoded video frame's reference frames if the first decoded video frame is a non-reference frame. Method 400 may next proceed to step 435. At step 435, the first decoded video frame may be classified as one of dark or non-dark. In some embodiments of the present disclosure, the first decoded video frame may be classified as dark if each of the second plurality of macroblocks has a DC value lower than a threshold DC value.

Method 400 may next proceed to step 440. At step 440, an adjusted Qp value may be calculated for each of the first plurality of macroblocks. In some embodiments of the present disclosure, the adjusted Qp value for a first macroblock of the first plurality of macroblocks may be calculated as the weighted average Qp+(a Qp value of the first encoded video frame−(the Qp value of the first encoded video frame/a first compression specific constant) if the Qp value of the first encoded video frame<the weighted average Qp+a second compression specific constant.

In some embodiments of the present disclosure, the adjusted Qp value for a first macroblock of the first plurality of macroblocks may be calculated as the weighted average Qp+(a Qp value of the first encoded video frame−(the Qp value of the first encoded video frame/a third compression specific constant) if the Qp value of the first encoded video frame is greater than or equal to the weighted average Qp+the second compression specific constant. Alternatively, the adjusted Qp value for a first macroblock of the first plurality of macroblocks may be calculated as a Qp value of the first encoded video frame if the first encoded video frame is an intra frame.

Method 400 may next proceed to step 445. At step 445, a weighted sum of all adjusted Qp values may be calculated. In some embodiments of the present disclosure, the weighted sum of all adjusted Qp values may be calculated using a weighting value assigned as a function of whether each of the second plurality of macroblocks is edge or non-edge and dark or non-dark. For example, the function may assign macroblocks classified as edge and non-dark a highest relative weighting value. Alternatively, the function may assigns macroblocks classified as non-edge and dark a lowest relative weighting value.

Method 400 may next proceed to step 450. At step 450, the weighted sum may be converted to a frame adjusted Qp. In some embodiments of the present disclosure, converting the weighted sum to the frame adjusted Qp may be achieved by dividing the weighted sum of all adjusted Qp values by a sum of all applied weighting values.

Method 400 may next proceed to step 455. At step 455, the frame adjusted Qp may be mapped to a frame VQ. In some embodiments of the present disclosure, mapping the frame adjusted Qp to a frame VQ may be achieved by referencing a look-up table associating a plurality of frame adjusted Qp values to a plurality of corresponding frame VQ values. Separate look-up tables may be maintained for a plurality of codec formats and associated supported video compression (e.g., HD and SD).

Method 400 may finally proceed to step 460. At step 460, a stream video quality (SVQ) may be calculated for the first video stream. In some embodiments of the present disclosure, the SVQ may be calculated as a nonlinear average of frame VQs for the first plurality of video frames. For example, a SVQ weight may be assigned for each of the first plurality of video frames based on the frame VQ values calculated for said each of the first plurality of video frames. Next, each frame VQ value may be divided by its associated SVQ weight to calculate a first SVQ value for each of the first plurality of video frames. The first SVQ values for each of the first plurality of video frames may then be multiplied with the assigned SVQ weights for each of the first plurality of video frames to create a second SVQ value for each of the first plurality of video frames. The second SVQ values for each of the first plurality of video frames may then be summed to calculate a weighted SVQ for the first video stream. In some embodiments of the present disclosure, a final SVQ value may be determined as 10 ^the weighted SVQ.

Figure 5:
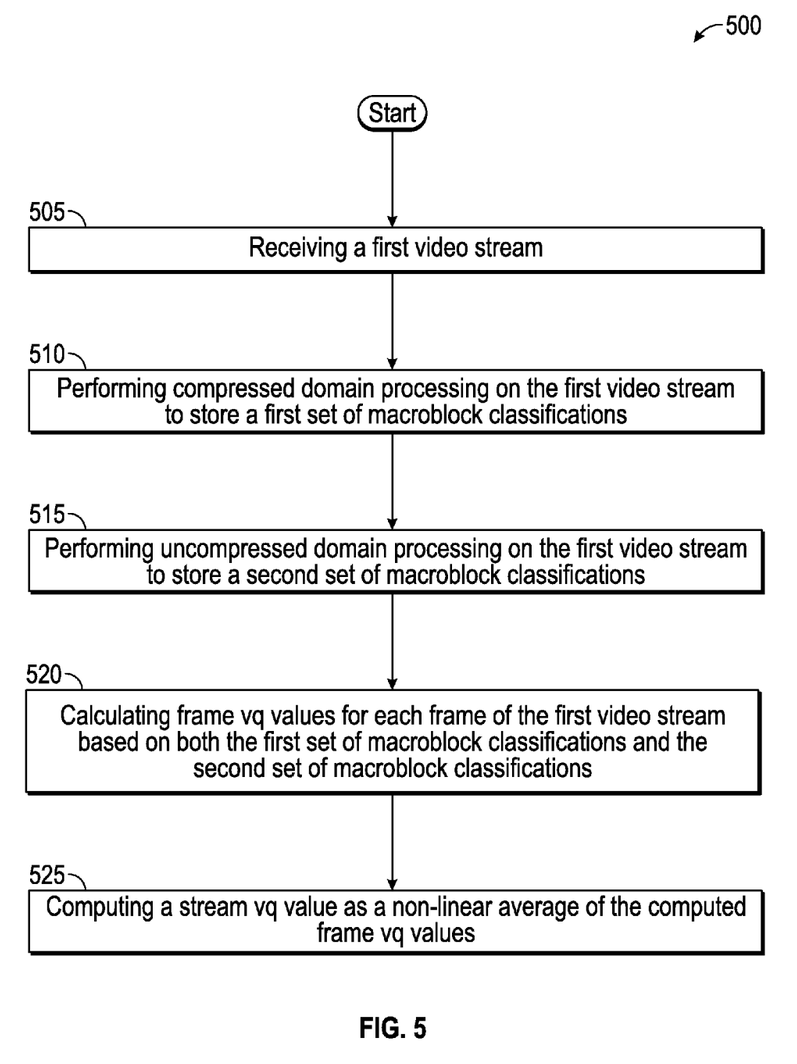
FIG. 5 illustrates a flow chart of sample embodiments of the present disclosure.

FIG. 5 is a flow chart illustrating embodiments of the present disclosure. Method 500 may begin at step 505, where a first video stream may be received. Method 500 may subsequently proceed to step 510. At step 510, compressed domain processing may be performed on the first video stream to store a first set of macroblock classifications. Similarly, at step 515, uncompressed domain processing may be performed on the first video stream to store a second set of macroblock classifications.

Method 500 may then proceed to step 520. At step 520, frame VQ values for each frame of the first video stream may be calculated based on both the first set of macroblock classifications and the second set of macroblock classifications. Finally, method 500 may proceed to step 525 where a stream VQ value may be computed as a non-linear average of the computed frame VQ values.

Figure 6:
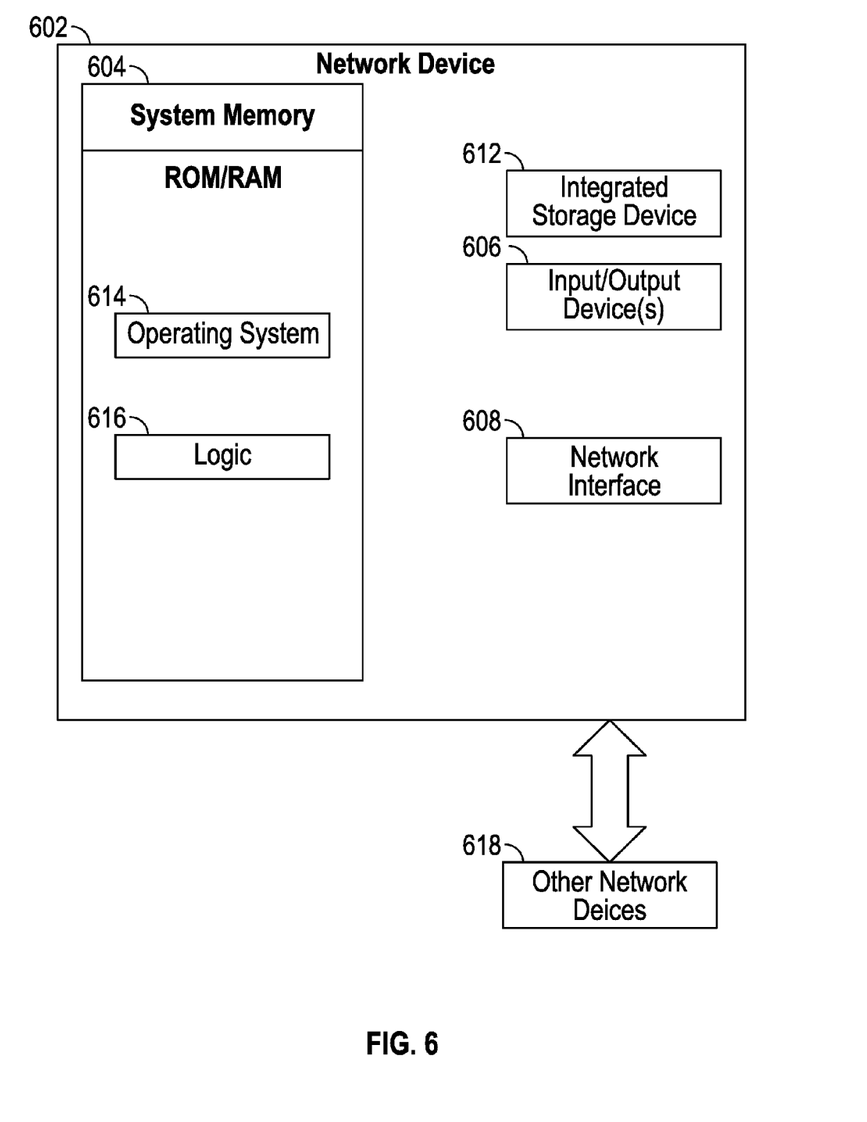
FIG. 6 shows a network device according to embodiments of the present disclosure in greater detail.

FIG. 6 shows a network device (such as headend 110) in greater detail. A network device may include a processing device 602, a memory 604, input/output (I/O) devices 606, and a network interface 608, each of which may be communicatively coupled via a local interface (not shown). Processing device 602 may be a hardware device for executing software, particularly that which is stored in memory 604. Processing device 602 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 602 may include software at least capable of operating described embodiments of the present disclosure.

Network interface 608 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 606 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 610 may include address, control, and/or data connections to enable appropriate communications among the aforementioned components and provides the interface to communicate with a network controller, a host tracking database, a fabric edge router, or any number of other network devices in a networking environment.

In some embodiments, a network device may further be configured with an integrated storage device 612 coupled to local interface 610. Storage device 612 may be configured to buffer a plurality of data packets. One or more such buffers may be dedicated buffers for storing captured packets. In some embodiments, storage device 612 may be externally coupled to a content server (not shown).

Memory 604 may include a suitable operating system (O/S) 614. Operating system 614 essentially may control the execution of other computer programs, such as scheduling, input-output control, file and data management, memory management, and communication control and related services. Logic 616 may include executable code to send service requests to the local system, the remote system, a fabric edge router, or any number of other network devices in a networking environment.

Memory 604 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 604 may incorporate electronic, magnetic, optical, semi-conductive, and/or other types of storage media. Note that memory 604 may have a distributed architecture, where various components are situated remotely from one another, which can be accessed by the processing device 602.

The software in memory 604 may include one or more separate programs, each of which comprises an ordered listing of executable instructions for implementing logical functions. In the embodiment shown in FIG. 6, the software in memory 604 may include operating system 614 and logic 616, as explained above. Functionality of logic 616 may be implemented using a single module, or distributed among a plurality of modules.

When logic 616 is in operation, processing device 602 may be configured to execute logic 616 stored within memory 604, to communicate data to and from memory 604, and to generally control operations of logic 616. Logic 616 and O/S 614, in whole or in part, but typically the latter, are read by processing device 602, perhaps buffered within processing device 602, and then executed.

The network controller may include a communication interface suitable for enabling communication (e.g., TCP/IP) of data packets with other network devices 618 of a network environment. For instance, the communication interface may be of a type suitable for communication over an IP network, a coaxial cable network, an HFC network, and/or wireless network, among others.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving a first encoded video frame of a first video stream comprising a first plurality of video frames, the first encoded video frame comprising a first plurality of macroblocks;
    storing a macroblock type and a quantization parameter Qp for each of the first plurality of macroblocks;
    determining a weighted average Qp for the first encoded video frame's reference frames based at least in part on stored Qps if the first encoded video frame is a non-reference frame;
    determining an adjusted Qp value for each of the first plurality of macroblocks based at least in part on the weighted average Qp;
    determining a weighted sum of all adjusted Qp values;
    converting the weighted sum to a frame adjusted Qp;
    mapping the frame adjusted Qp to a frame video quality VQ;
    determining a stream video quality SVQ for the first video stream as a nonlinear average of frame VQs for the first plurality of video frames;
    decoding the first encoded video frame to create a first decoded video frame comprising a second plurality of macroblocks; and
    determining the weighted sum of all adjusted Qp values using a weighting value assigned as a function of a classification of each of the second plurality of macroblocks as one of the following: an edge and a non-edge and one of the following: dark and non-dark.

2. The method of claim 1, wherein the first video stream is encoded as one of the following: MPEG-2, AVC, and HEVC.

3. The method of claim 1, further comprising: maintaining Qp values for non-reference frames separate by classification.

4. The method of claim 1, further comprising:
    decimating a macroblock of the second plurality of macroblocks;
    performing a Discrete Cosine Transform (DCT) on the decimated macroblock;
    summing a plurality of DCT coefficients; and
    classifying the macroblock as edge when the DCT coefficient sum is greater than an edge threshold value.

5. The method of claim 1, further comprising:
    extracting a Qp value for each of the first plurality of macroblocks during a decoding process.

6. The method of claim 1, further comprising:
    determining the adjusted Qp value for a first macroblock of the first plurality of macroblocks as the weighted average Qp+(a Qp value of the first encoded video frame−(the Qp value of the first encoded video frame/a first compression specific constant) if the Qp value of the first encoded video frame<the weighted average Qp+a second compression specific constant.

7. The method of claim 1, further comprising:
    determining the adjusted Qp value for a first macroblock of the first plurality of macroblocks as the weighted average Qp+(a Qp value of the first encoded video frame−(the Qp value of the first encoded video frame/a third compression specific constant) if the Qp value of the first encoded video frame is greater than or equal to the weighted average Qp+a second compression specific constant.

8. The method of claim 1, determining the adjusted Qp value for a first macroblock of the first plurality of macroblocks as a Qp value of the first encoded video frame if the first encoded video frame is an intra frame.

9. The method of claim 1, further comprising:
    determining a DC shift value of the first decoded video frame as compared to the first decoded video frame's reference frames if the first decoded video frame is a non-reference frame;
    classifying the first decoded video frame as one of the dark or the non-dark, wherein the first decoded video frame is classified as dark when each of the second plurality of macroblocks has a DC value lower than a threshold DC value; and
    determining the weighted sum of all adjusted Qp values using a weighting value assigned as a function of whether each of the second plurality of macroblocks is edge or non-edge and dark or non-dark.

10. The method of claim 9, wherein the function assigns macroblocks classified as the edge and non-dark a highest relative weighting value.

11. The method of claim 9, wherein the function assigns macroblocks classified as the non-edge and the dark a lowest relative weighting value.

12. The method of claim 1, further comprising: converting the weighted sum to the frame adjusted Qp by dividing the weighted sum of all adjusted Qp values by a sum of all applied weighting values.

13. The method of claim 1, further comprising: mapping the frame adjusted Qp to a frame VQ by referencing a look-up table associating a plurality of frame adjusted Qp values to a plurality of corresponding frame VQ values.

14. The method of claim 13, further comprising: maintaining separate look-up tables for a plurality of codec formats.

15. The method of claim 14, further comprising: maintaining separate look-up tables for standard definition and high definition format for each of the plurality of codec formats.

16. The method of claim 1, further comprising: assigning a SVQ weight for each of the first plurality of video frames based on the frame VQ values calculated for said each of the first plurality of video frames.

17. The method of claim 16, further comprising:
dividing each frame VQ value by its associated SVQ weight to calculate a first SVQ value for each of the first plurality of video frames;
multiplying first SVQ value for each of the first plurality of video frames with the assigned SVQ weights for each of the first plurality of video frames to create a second SVQ value for each of the first plurality of video frames; and
summing the second SVQ values for each of the first plurality of video frames to calculate a weighted SVQ for the first video stream.

18. The method of claim 17, further comprising:
determining a final SVQ value as 10^the weighted SVQ.

19. The method of claim 1, further comprising:
decimating a macroblock of the second plurality of macroblocks;
performing a DCT on the decimated macroblock;
summing a plurality of DCT coefficients; and
classifying the macroblock as the non-edge when the DCT coefficient sum is less than or equal to an edge threshold value.

20. A system comprising:
a memory;
a processor capable of executing instructions stored on the memory, the instructions comprising:
receiving a first encoded video frame of a first video stream comprising a first plurality of video frames, the first encoded video frame comprising a first plurality of macroblocks;
storing a macroblock type and a quantization parameter (Qp) for each of the first plurality of macroblocks;
determining a weighted average Qp for the first encoded video frame's reference frames if the first encoded video frame is a non-reference frame;
determining an adjusted Qp value for each of the first plurality of macroblocks based at least in part on the weighted average Qp;
determining a weighted sum of all adjusted Qp values;
converting the weighted sum to a frame adjusted Qp;
mapping the frame adjusted Qp to a frame video quality VQ;
determining a stream video quality SVQ for the first video stream as a nonlinear average of frame VQs for the first plurality of video frames;
decoding the first encoded video frame to create a first decoded video frame comprising a second plurality of macroblocks; and
determining the weighted sum of all adjusted Qp values using a weighting value assigned as a function of whether a classification of each of the second plurality of macroblocks as one of the following: an edge and a non-edge and one of the following: dark and non-dark.

21. The system of claim 20, where the instructions further comprise:
decimating a macroblock of the second plurality of macroblocks;
performing a Discrete Cosine Transform (DCT) on the decimated macroblock;
summing a plurality of DCT coefficients; and
classifying the macroblock as edge when the DCT coefficient sum is greater than an edge threshold value.

22. The system of claim 20, wherein the instructions further comprise:
determining a DC shift value of the first decoded video frame as compared to the first decoded video frame's reference frames if the first decoded video frame is a non-reference frame;
classifying the first decoded video frame as one of the dark or the non-dark, wherein the first decoded video frame is classified as the dark if each of the second plurality of macroblocks has a DC value lower than a threshold DC value; and
determining the weighted sum of all adjusted Qp values using a weighting value assigned as a function of whether each of the second plurality of macroblocks is edge or non-edge and dark or non-dark.

23. The system of claim 20, where the instructions further comprise:
decimating a macroblock of the second plurality of macroblocks;
performing a DCT on the decimated macroblock;
summing a plurality of DCT coefficients; and
classifying the macroblock as non-edge only if the DCT coefficient sum is less than or equal to an edge threshold value.

* * * * *